United States Patent
Yamaguchi

(10) Patent No.: US 7,957,046 B2
(45) Date of Patent: Jun. 7, 2011

(54) OPTICAL BEAM SCANNING APPARATUS, METHOD OF MANUFACTURING OPTICAL BEAM SCANNING APPARATUS, IMAGE FORMING APPARATUS AND METHOD OF MANUFACTURING IMAGE FORMING APPARATUS

(75) Inventor: Masao Yamaguchi, Katsushika-ku (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/757,149

(22) Filed: Apr. 9, 2010

(65) Prior Publication Data
US 2010/0208320 A1 Aug. 19, 2010

Related U.S. Application Data

(63) Continuation of application No. 12/350,733, filed on Jan. 8, 2009, now Pat. No. 7,724,410, and a continuation of application No. 11/694,479, filed on Mar. 30, 2007, now Pat. No. 7,508,565.

(51) Int. Cl.
G02B 26/08 (2006.01)
(52) U.S. Cl. ................................. 359/207.7
(58) Field of Classification Search .............. 359/205.1, 359/206.1, 207.1, 207.7; 347/258, 259
See application file for complete search history.

(56) References Cited

U.S. PATENT DOCUMENTS

| 6,888,655 | B2 | 5/2005 | Yamaguchi | |
|---|---|---|---|---|
| 7,170,662 | B2 * | 1/2007 | Sakai et al. | 359/206.1 |
| 2004/0130800 | A1 | 7/2004 | Honda | |
| 2006/0066712 | A1 * | 3/2006 | Sakai | 347/244 |

FOREIGN PATENT DOCUMENTS

| JP | 2002-328323 | 11/2002 |
|---|---|---|
| JP | 2005-024958 | 1/2005 |
| JP | 2005-049506 | 2/2005 |
| JP | 2005-049509 | 2/2005 |
| JP | 2005-062399 | 3/2005 |

OTHER PUBLICATIONS

Beiser, Laser Scanning Notebook, LSN-8-11/91, The Polygon Scanner, 1992.
U.S. Office Action dated Jun. 29, 2009 corresponding to U.S. Appl. No. 12/350,733 filed on Jan. 8, 2009.
U.S. Office Action dated Apr. 21, 2008 corresponding to U.S. Appl. No. 11/694,479 filed on Mar. 30, 2007.

* cited by examiner

*Primary Examiner* — Euncha P Cherry
(74) *Attorney, Agent, or Firm* — Turocy & Watson, LLP

(57) ABSTRACT

In an image forming apparatus according to the invention, an optical beam scanning apparatus of an overillumination scanning optical system includes a laser, a pre-deflection optical system, a polygon mirror, and a post-deflection optical system, wherein the post-deflection optical system includes at least one optical element configured by allowing a resin to flow into a molding die through a gate opening provided in advance to the molding die and then molding the resin into a prescribed shape; and in the optical element, a side corresponding to aside of the gate opening through which the resin flows is provided to a light incidence side where the luminous flux enters into the polygon mirror.

16 Claims, 14 Drawing Sheets

INCIDENT SURFACE

| CUY | CYZ | AY | AZ |
|---|---|---|---|
| -6.19E-03 | -7.12E-03 | 1 | 1 |

| | | m | | | | | | | | | |
|---|---|---|---|---|---|---|---|---|---|---|---|
| | | 0 | 1 | 2 | 3 | 4 | 5 | 6 | 7 | 8 | 9 | 10 |
| n | 0 | 0.00E+00 | -1.54E-03 | 1.84E-03 | -2.07E-07 | 1.18E-07 | 5.92E-12 | -5.89E-12 | -2.33E-15 | 3.31E-16 | -1.28E-19 | -1.93E-20 |
| | 1 | 1.34E-02 | -1.25E-06 | -2.09E-07 | -1.37E-10 | 1.11E-10 | -5.79E-14 | -8.30E-15 | -1.04E-17 | 4.72E-19 | 1.31E-21 | 2.24E-23 |
| | 2 | 2.26E-05 | -1.73E-09 | 4.67E-11 | 3.62E-12 | -1.18E-13 | -1.23E-15 | 2.14E-17 | -3.94E-21 | 8.65E-21 | 1.92E-23 | -1.93E-25 |

EMITTING SURFACE

| CUY | CYZ | AY | AZ |
|---|---|---|---|
| 3.26E-03 | 2.76E-02 | 1 | 1 |

| | | m | | | | | | | | | |
|---|---|---|---|---|---|---|---|---|---|---|---|
| | | 0 | 1 | 2 | 3 | 4 | 5 | 6 | 7 | 8 | 9 | 10 |
| n | 0 | 0.00E+00 | -1.69E-03 | -9.88E-04 | -1.85E-07 | 6.45E-08 | -6.44E-12 | -3.12E-12 | 3.44E-16 | 1.40E-16 | -3.37E-19 | -1.74E-20 |
| | 1 | 3.37E-03 | -7.72E-07 | -4.14E-07 | -2.46E-10 | 6.75E-11 | 2.42E-14 | -1.50E-15 | -1.30E-17 | -1.04E-19 | 3.36E-22 | 4.27E-23 |
| | 2 | 5.30E-06 | 7.69E-10 | 4.85E-10 | 2.42E-13 | 1.44E-13 | 1.32E-16 | -2.28E-17 | -1.32E-19 | 3.18E-21 | 1.54E-23 | 3.40E-25 |

INCIDENT SURFACE

| | CUY | CYZ | AY | AZ |
|---|---|---|---|---|
| | -5.672E-03 | -4.660E-03 | 1 | 1 |

| n \ m | 0 | 1 | 2 | 3 | 4 | 5 | 6 | 7 | 8 | 9 | 10 |
|---|---|---|---|---|---|---|---|---|---|---|---|
| 0 | 0.000E+00 | 2.787E-03 | 1.980E-03 | 1.335E-07 | 1.044E-07 | -2.786E-11 | -7.059E-12 | 3.692E-15 | 1.841E-16 | -6.741E-20 | -1.779E-20 |
| 1 | 4.553E-03 | 1.328E-06 | -2.476E-07 | 5.778E-10 | 9.129E-11 | -1.236E-14 | -7.811E-15 | -2.800E-18 | 3.600E-19 | 6.332E-22 | 8.659E-24 |
| 2 | 5.619E-06 | -7.489E-09 | -8.817E-10 | 1.685E-12 | -6.660E-14 | -5.188E-16 | 9.075E-18 | 1.148E-19 | 5.498E-21 | -5.670E-24 | -3.951E-25 |

EMITTING SURFACE

| | CUY | CYZ | AY | AZ |
|---|---|---|---|---|
| | 5.092E-03 | 1.651E-02 | 1 | 1 |

| n \ m | 0 | 1 | 2 | 3 | 4 | 5 | 6 | 7 | 8 | 9 | 10 |
|---|---|---|---|---|---|---|---|---|---|---|---|
| 0 | 0.000E+00 | -1.071E-03 | -8.388E-04 | 1.647E-07 | 5.067E-08 | -2.561E-11 | -4.086E-12 | 1.397E-15 | 1.539E-16 | 1.951E-19 | -4.158E-20 |
| 1 | 3.809E-03 | 9.143E-07 | -3.924E-07 | 5.036E-10 | 4.401E-11 | -2.248E-14 | -5.812E-16 | 4.130E-18 | -1.228E-19 | 2.809E-22 | 9.314E-24 |
| 2 | 2.945E-06 | -4.016E-09 | -1.720E-10 | 2.644E-13 | -3.675E-14 | -4.145E-17 | -1.222E-17 | 1.238E-20 | 3.609E-21 | 1.408E-24 | 7.214E-26 |

OPTICAL BEAM SCANNING APPARATUS, METHOD OF MANUFACTURING OPTICAL BEAM SCANNING APPARATUS, IMAGE FORMING APPARATUS AND METHOD OF MANUFACTURING IMAGE FORMING APPARATUS

CROSS-REFERENCE TO RELATED APPLICATIONS

This application claims the benefit of priority from and is a Continuation of application Ser. No. 12/350,733 filed on Jan. 9, 2009, which claims the benefit of priority from and is a Continuation of application Ser. No. 11/694,479 filed on Mar. 30, 2007, the entire contents of both of which are incorporated herein by reference.

BACKGROUND OF THE INVENTION

1. Technical Field of the Invention

The present invention relates to an optical beam scanning apparatus and a method of manufacturing an optical beam scanning apparatus and to an image forming apparatus provided with this optical scanning apparatus and a method of manufacturing an image forming apparatus. In particular, the invention relates to an optical beam scanning apparatus which in an overillumination scanning optical system in which a width of a luminous flux made incident on a polygon mirror is wider than a width of one reflecting surface forming the polygon mirror, is capable of scanning the luminous flux on a photoconductive drum and a method of manufacturing an optical beam scanning apparatus and to an image forming apparatus provided with this optical beam scanning apparatus and a method of manufacturing an image forming apparatus.

2. Related Art

In recent years, in image forming apparatus of an electrophotographic mode, for example, laser printers, digital copiers and laser facsimiles, an optical beam scanning apparatus for irradiating laser light (optical beam) on a surface of a photoconductive drum and scanning the laser light to form an electrostatic latent image on the photoconductive drum is provided.

Recently, in order to devise to realize high-speed scanning on a surface of a photoconductive drum, for example, a method in which plural light sources (laser diodes) are provided in one laser unit, thereby increasing the number of laser light per one scanning (multibeam method) is proposed. In this multibeam method, plural beams for every color component emitted from each of light sources (for example, yellow, magenta, cyan, and black) are processed in a pre-deflection optical system and converted into one beam, which is then made incident on a polygon mirror. The beam deflected by the polygon mirror is mediated through an fθ lens configuring a post-deflection optical system and subsequently separated into a beam for every color component and irradiated on a photoconductive drum of every color component.

Here, the rotation axis direction of the polygon mirror as a deflector is defined as "sub-scanning direction", and a direction vertical to each of the optical axis direction of the optical system and the rotation axis direction of the deflector (polygonal mirror) is defined as "main scanning direction". Incidentally, the sub-scanning direction in the optical system is corresponding to a conveyance direction of a transfer material in an image forming apparatus, and the main scanning direction in the optical system is corresponding to a direction vertical to the conveyance direction within a surface of the transfer material in the image forming apparatus. Also, an image surface shows the surface of the photoconductive drum, and an imaging surface shows a surface on which a luminous flux (laser light) actually forms an image.

In general, a relation expressed by [Expression 1] is present among an image processing rate (paper conveyance rate), an image resolution, a motor rotation rate and a number of polygon mirror surfaces.

$$P*R = \frac{25.4*Vr*N}{60} \quad \text{[Expression 1]}$$

In the foregoing expression, P (mm/s) represents a processing rate (paper conveyance rate); and R (dpi) represents an image resolution (number of dots per inch). Also, Vr (rpm) represents a number of revolutions of a polygon motor; and N represents a number of polygon mirror surfaces.

As expressed by the foregoing [Expression 1], the printing speed and resolution in the image forming apparatus are proportional to the number of revolutions of a polygon motor (Vr) and the number of polygon mirror surfaces (N). Accordingly, in order to realize high resolution as well as high speed in the image forming apparatus, it is necessary to increase the number of polygon mirror surfaces (N) or to raise the number of revolutions of the polygon motor (Vr).

However, in a conventional general underillumination scanning optical system, a width of a luminous flux (laser light) made incident on a polygon mirror in a main scanning direction is made smaller than a width of one reflecting surface forming the polygon mirror in the main scanning direction (reflection width) thereby reflecting the whole of the luminous flux (laser light) made incident on the polygon mirror.

However, since not only a beam diameter on the image surface is proportional to an F number, but also the F number Fn is expressed by Fn=f/D wherein f represents a focal distance of the imaging optical system, and D represents a beam diameter of the main scanning direction on the polygon mirror surface, when it is intended to make the beam diameter on the image surface small for the purpose of devising to realize high image quality, the beam diameter of the main scanning direction on the polygon mirror surface must be made large.

In other words, in order to obtain high image quality at a certain level or more, there is a restriction that the beam diameter of the main scanning direction on the polygon mirror surface must be regulated to a fixed size or more.

Nevertheless, in order to realize high resolution as well as high speed, when it is intended to increase the number of polygon mirror surfaces (N), the polygon mirror itself must be increased in size. As a result, when it is intended to rotate a large-sized polygon mirror at a high speed, a load to a motor for driving the polygon mirror becomes large, and the motor cost increases. In addition, at the same time, the noise or vibration of the motor or the generation of a heat becomes large, and a countermeasure thereto becomes necessary separately.

Then, an image forming apparatus using an over-illumination scanning optical system is proposed in place of the underillumination scanning optical system. In the overillumination scanning optical system, a width of a luminous flux made incident on a polygon mirror is made wider than a width of one reflecting surface forming the polygon mirror.

According to this, it is possible to reflect the luminous flux by using the entire surface of the reflecting surface forming the polygon mirror (or plural reflecting surfaces); and even in the case where it is intended to ensure the beam diameter on the polygon mirror surface while increasing the number of reflecting surfaces of polygon mirror (N) for the purpose of devising to realize high resolution as well as high speed, it is possible to make the diameter of the polygon mirror itself small. Accordingly, a load to a motor for driving the polygon mirror can be reduced, and the motor cost can be reduced. Also, since not only the diameter of the polygon mirror itself can be made small, but also the number of reflecting surfaces can be increased, it is possible to make the shape of the polygon mirror close to a circle, and it is possible to make the air resistance at the time of driving the polygon mirror low. As a result, even when the polygon mirror is rotated in a high speed, it is possible to reduce the noise or vibration and the generation of a heat.

Furthermore, following the reduction in the noise or vibration and the generation of heat, the whole or a part of countermeasures element for reducing the noise or vibration, such as glasses, become unnecessary, and the costs in manufacturing an image forming apparatus can be lowered. Also, a high duty cycle becomes possible.

The foregoing overillumination scanning optical system is described in, for example, Leo Beiser, *Laser Scanning Notebook*, SPIE OPTICAL ENGINEERING PRESS.

In the case where an imaging lens is manufactured by using a resin as a material of an imaging lens included in a post-deflection optical system and molding the resin into a prescribed shape, gate cutting becomes necessary. But, a residual stain or deformation is generated in the vicinity of the gate cut part of the manufactured imaging lens due to a heat at the time of gate cutting.

For example, in the case where the lens of a post-deflection optical system is a molded lens which is manufactured by molding a resin which has been allowed to flow into a molding die through a side gate opening, a residual strain or deformation or the like is generated in an end of the imaging lens in the side corresponding to the side of the gate opening or the like due to a heat at the time of gate cutting.

When a luminous flux (laser light) passes through a gate cut part of the lens in which a residual strain or deformation or the like has been generated due to a heat at the time of such gate cutting, the beam diameter on the image surface becomes large as compared with the usual.

In particular, in the case where the lens of a post-deflection optical system is configured of a single lens, since the lens requires a larger power, it is necessary that the lens is a thick-wall lens. For that reason, the cross-sectional area of the lens to be molded in the vicinity of the side gate opening for making a resin flow therein (gate cut part of the lens) becomes large so that when it is intended to gate cut this portion, a residual strain or deformation is more likely generated in the lens due to a heat at the time of gate cutting. As a result, when a luminous flux (laser light) passes through the gate cut part of the lens, the beam diameter on the image surface becomes larger as compared with the usual.

Here, in the conventional underillumination scanning optical system, a width of a laser beam L deflected by the polygon mirror corresponding to the main scanning direction was constant irrespective of the scanning position (angle). However, in the overillumination scanning optical system, the width of the laser beam L corresponding to the main scanning direction fluctuates depending upon the scanning position (angle).

Concretely, in the case where the optical axis of the laser beam L made incident on the polygon mirror and the optical axis of the post-deflection optical system form an angle, the width of the luminous flux corresponding to the main scanning direction fluctuates depending upon the scanning position (angle).

For that reason, the F number varies depending upon the scanning position (angle); and when the laser beam is made incident on the polygon mirror, as it goes from a light incidence side to an opposite side to the light incidence side, the beam diameter of the main scanning direction on the image surface becomes large, thereby generating scattering in beam diameter of the main scanning direction on the image surface. In other words, the beam diameter of the main scanning direction on the image surface is bilaterally asymmetric against the optical axis of the optical system in a scanning region on the photoconductive drum; and when the laser beam L is made incident on the polygon mirror, as it goes from a light incidence side to an opposite side to the light incidence side, the optical characteristics on the image surface become worse.

For that reason, in the case of manufacturing an imaging lens by molding a resin, when the side gate is used, if the gate cut part of the imaging lens is arranged in the opposite side to the light incidence side, in the opposite side to the light incidence side, in addition to the worseness of optical characteristics on the image surface, the beam diameter on the image surface becomes very large due to influences of a residual strain or deformation generated at the time of gate cutting.

As a result, scattering in the beam diameter in a scanning region of the photoconductive drum as an image surface becomes large.

SUMMARY OF THE INVENTION

The present invention was made in the view of the circumstances encouraged in the prior art mentioned above, and it is an object of the present invention to provide an optical beam scanning apparatus which even in the case where a residual strain or deformation is generated at the time of lens molding, is able to not only reduce scattering in a beam diameter in a scanning region but also prevent the deterioration of image quality and a method of manufacturing an optical beam scanning apparatus, and an image forming apparatus provided with this optical beam scanning apparatus and a method of manufacturing an image forming apparatus.

In order to solve the foregoing problems, an optical beam scanning apparatus according to an aspect of the invention is an optical beam scanning apparatus including a light source for emitting a luminous flux, a pre-deflection optical system for forming a luminous flux emitted from the light source to image the luminous flux as a line image in a prescribed direction corresponding to a main scanning direction, a scanning unit configured to scan the imaged luminous flux by the pre-deflection optical system against a scanning subject, and a post-deflection optical system for imaging the luminous flux scanned by the scanning unit on the scanning subject, in which a width of the luminous flux made incident on the scanning unit from the pre-deflection optical system is wider than a width of one reflecting surface forming the scanning unit and an angle formed by an optical axis of the luminous flux made incident on the scanning unit and an optical axis of the post-deflection optical system is satisfied with a prescribed condition, wherein the post-deflection optical system includes at least one optical element configured by allowing a resin to flow into a molding die through a gate opening provided in advance to the molding die and then molding the resin into a prescribed shape; and in the optical element, a side corresponding to a side of the gate opening through which the resin flows is provided to a light incidence side where the luminous flux enters into the scanning unit.

In order to solve the foregoing problems, a method of manufacturing an optical beam scanning apparatus according to an aspect of the invention is a method of manufacturing of an optical beam scanning apparatus including a light source for emitting a luminous flux, a pre-deflection optical system for forming a luminous flux emitted from the light source to image the luminous flux as a line image in a prescribed direction corresponding to a main scanning direction, a scanning unit configured to scan the imaged luminous flux by the pre-deflection optical system against a scanning subject, and a post-deflection optical system for imaging the luminous flux scanned by the scanning unit on the scanning subject, in which a width of the luminous flux made incident on the scanning unit from the pre-deflection optical system is wider than a width of one reflecting surface forming the scanning unit and an angle formed by an optical axis of the luminous flux made incident on the scanning unit and an optical axis of the post-deflection optical system is satisfied with a prescribed condition, wherein after allowing a resin to flow into a molding die through a gate opening for allowing a resin to flow into the molding die, which is provided in advance to the molding die, the flown-in resin is molded into a prescribed shape to manufacture an optical element; and in arranging at least one optical element in the post-deflection optical system, the optical element is arranged such that a side corresponding to a side of the gate opening through which the resin flows is a light incidence side where the luminous flux enters into the scanning unit.

In order to solve the foregoing problems, an image forming apparatus according to an aspect of the invention is an image forming apparatus provided with an optical beam scanning apparatus including a light source for emitting a luminous flux, a pre-deflection optical system for forming a luminous flux emitted from the light source to image the luminous flux as a line image in a prescribed direction corresponding to a main scanning direction, a scanning unit configured to scan the imaged luminous flux by the pre-deflection optical system against a scanning subject, and a post-deflection optical system for imaging the luminous flux scanned by the scanning unit on the scanning subject, in which a width of the luminous flux made incident on the scanning unit from the pre-deflection optical system is wider than a width of one reflecting surface forming the scanning unit and an angle formed by an optical axis of the luminous flux made incident on the scanning unit and an optical axis of the post-deflection optical system is satisfied with a prescribed condition, wherein the post-deflection optical system includes at least one optical element configured by allowing a resin to flow into a molding die through a gate opening provided in advance to the molding die and then molding the resin into a prescribed shape; and in the optical element, a side corresponding to a side of the gate opening through which the resin flows is provided to a light incidence side where the luminous flux enters into on the scanning unit.

In order to solve the foregoing problems, a method of manufacturing an image forming apparatus according to an aspect of the invention is a method of manufacturing of an image forming apparatus provided with an optical beam scanning apparatus including a light source for emitting a luminous flux, a pre-deflection optical system for forming a luminous flux emitted from the light source to image the luminous flux as a line image in a prescribed direction corresponding to a main scanning direction, a scanning unit configured to scan the imaged luminous flux by the pre-deflection optical system against a scanning subject, and a post-deflection optical system for imaging the luminous flux scanned by the scanning unit on the scanning subject, in which a width of the luminous flux made incident on the scanning unit from the pre-deflection optical system is wider than a width of one reflecting surface forming the scanning unit and an angle formed by an optical axis of the luminous flux made incident on the scanning unit and an optical axis of the post-deflection optical system is satisfied with a prescribed condition, wherein after allowing a resin to flow into a molding die through a gate opening for allowing a resin to flow into the molding die, which is provided in advance to the molding die, the flown-in resin is molded into a prescribed shape to manufacture an optical element; and in arranging at least one optical element in the post-deflection optical system, the optical element is arranged such that a side corresponding to aside of the gate opening through which the resin flows is a light incidence side where the luminous flux enters into the scanning unit.

In the optical beam scanning apparatus according to an aspect of the invention, in the optical beam scanning apparatus including alight source for emitting a luminous flux, a pre-deflection optical system for forming a luminous flux emitted from the light source to image the luminous flux as a line image in a prescribed direction corresponding to a main scanning direction, a scanning unit configured to scan the imaged luminous flux by the pre-deflection optical system against a scanning subject, and a post-deflection optical system for imaging the luminous flux scanned by the scanning unit on the scanning subject, in which a width of the luminous flux made incident on the scanning unit from the pre-deflection optical system is wider than a width of one reflecting surface forming the scanning unit and an angle formed by an optical axis of the luminous flux made incident on the scanning unit and an optical axis of the post-deflection optical system is satisfied with a prescribed condition, the post-deflection optical system includes at least one optical element configured by allowing a resin to flow into a molding die from a gate opening provided in advance to the molding die and then molding the resin into a prescribed shape; and in the optical element, a side corresponding to a side of the gate opening through which the resin flows is provided to a light incidence side where the luminous flux enters into the scanning unit.

In the method of manufacturing an optical beam scanning apparatus according to an aspect of the invention, in the method of manufacturing of an optical beam scanning apparatus including a light source for emitting a luminous flux, a pre-deflection optical system for forming a luminous flux emitted from the light source to image the luminous flux as a line image in a prescribed direction corresponding to a main scanning direction, a scanning unit configured to scan the imaged luminous flux by the pre-deflection optical system against a scanning subject, and a post-deflection optical system for imaging the luminous flux scanned by the scanning unit on the scanning subject, in which a width of the luminous flux made incident on the scanning unit from the pre-deflection optical system is wider than a width of one reflecting surface forming the scanning unit and an angle formed by an optical axis of the luminous flux made incident on the scanning unit and an optical axis of the post-deflection optical system is satisfied with a prescribed condition, after allowing a resin to flow into a molding die through a gate opening for allowing a resin to flow into the molding die, which is provided in advance in the molding die, the flown-in resin is molded into a prescribed shape to manufacture an optical element; and in arranging at least one optical element in the post-deflection optical system, the optical element is arranged such that a side corresponding to aside of the gate opening through which the resin flows is a light incidence side where the luminous flux enters into the scanning unit.

In the image forming apparatus according to an aspect of the invention, in image forming apparatus provided with an optical beam scanning apparatus including a light source for emitting a luminous flux, a pre-deflection optical system for forming a luminous flux emitted from the light source to image the luminous flux as a line image in a prescribed direction corresponding to a main scanning direction, a scanning unit configured to scan the imaged luminous flux by the pre-deflection optical system against a scanning subject, and a post-deflection optical system for imaging the luminous flux scanned by the scanning unit on the scanning subject, in which a width of the luminous flux made incident on the scanning unit from the pre-deflection optical system is wider than a width of one reflecting surface forming the scanning unit and an angle formed by an optical axis of the luminous flux made incident on the scanning unit and an optical axis of the post-deflection optical system is satisfied with a prescribed condition, the post-deflection optical system includes at least one optical element configured by allowing a resin to flow into the molding die through a gate opening provided in advance to the molding die and then molding the resin into a prescribed shape; and in the optical element, a side corresponding to a side of the gate opening through which the resin flows is provided to a light incidence side where the luminous flux made enters into the scanning unit.

In the method of manufacturing an image forming apparatus according to an aspect of the invention, in the method of manufacturing of an image forming apparatus provided with an optical beam scanning apparatus including a light source for emitting a luminous flux, a pre-deflection optical system for forming a luminous flux emitted from the light source to image the luminous flux as a line image in a prescribed direction corresponding to a main scanning direction, a scanning unit configured to scan the imaged luminous flux by the pre-deflection optical system against a scanning subject, and a post-deflection optical system for imaging the luminous flux scanned by the scanning unit on the scanning subject, in which a width of the luminous flux made incident on the scanning unit from the pre-deflection optical system is wider than a width of one reflecting surface forming the scanning unit and an angle formed by an optical axis of the luminous flux made incident on the scanning unit and an optical axis of the post-deflection optical system is satisfied with a prescribed condition, after allowing a resin to flow into a molding die through a gate opening for allowing a resin to flow into the molding die, which is provided in advance to the molding die, the flown-in resin is molded into a prescribed shape to manufacture an optical element; and in arranging at least one optical element in the post-deflection optical system, the optical element is arranged such that a side corresponding to a side of the gate opening through which the resin flows is a light incidence side where the luminous flux enters into the scanning unit.

BRIEF DESCRIPTION OF THE DRAWINGS

In the accompanying drawings,

FIG. 4 is a diagram to show respective factors of a surface shape of an imaging lens;

FIG. 10 is a diagram to show respective factors of a surface shape of the imaging lens of FIG. 9;

DETAILED DESCRIPTION OF THE PREFERRED EMBODIMENTS

Embodiments of the invention are hereunder described with reference to the drawings.

Figure 1:
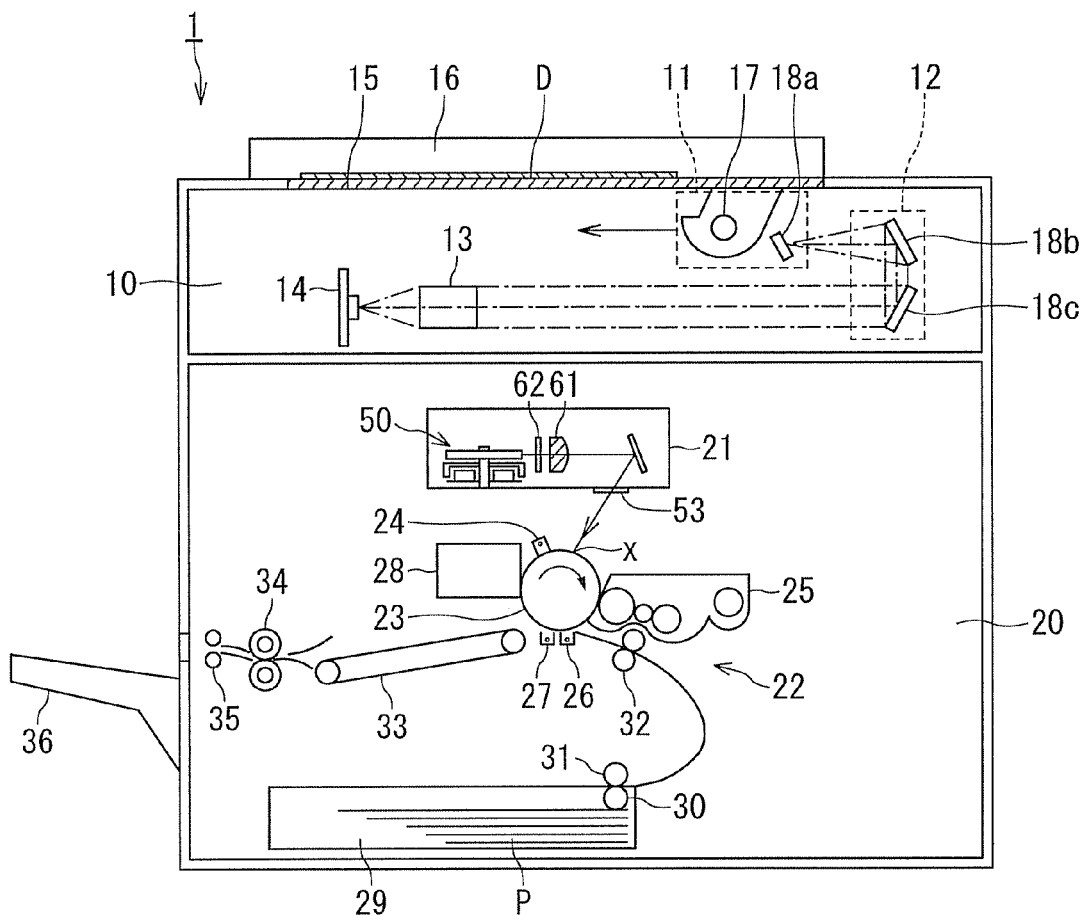
FIG. 1 is a view to show a configuration of an image forming apparatus provided with an optical beam scanning apparatus according to the invention.

FIG. 1 shows a configuration of an image forming apparatus 1 provided with an optical beam scanning apparatus 21 according to the invention.

As illustrated in FIG. 1, the image forming apparatus 1 includes, for example, a scanner section 10 as an image reading unit and a printer section 20 as an image forming unit.

The scanner section 10 has a first carriage 11 formed movably into an arrow direction; a second carriage 12 to be moved following the first carriage 11; an optical lens 13 for imparting a prescribed imaging characteristic to light from the second carriage 12; a photoelectric conversion device 14 for not only photoelectrically converting the light to which a prescribed imaging characteristic has been imparted by the optical lens 13 but outputting an electric signal after the photoelectric conversion; an original table 15 for holding an original D; an original fixing cover 16 for fixing the original D by pressing it onto the original table 15, and the like.

The first carriage 11 is provided with a light source 17 for illuminating the original D and a mirror 18a for reflecting catoptric light reflected from the original ID upon illumination with light emitted from the light source 17 towards the second carriage 12.

The second carriage 12 has a mirror 18b for bending light guided from the mirror 18a of the first carriage 11 by 90° and a mirror 18c for further bending the light which has been bent by the mirror 18b by 90°.

The original D placed on the original table 15 is illuminated by the light source 17, thereby reflecting catoptric light where light and shade of light corresponding to the presence or absence of an image is distributed. This catoptric light due to the original D is made incident and guided as image information of the original D into the optical lens 13 via the mirrors 18a, 18b and 18c.

The catoptric light guided into the optical lens 13 from the original D is collected on a light-receiving surface of the photoelectric conversion device (for example, a CCD sensor) 14 by the optical lens 13.

Then, when an indication to start the image formation is inputted from a non-illustrated operation panel or external apparatus, the first carriage 11 and the second carriage 12 are once moved to a home position which is determined in advance so as to have a prescribed positional relation to the original table 15 by drive of a non-illustrated carriage driving motor.

Thereafter, when the first carriage 11 and the second carriage 12 are moved along the original table 15 at a prescribed rate, not only the image information of the original D, namely the catoptric light (image light) reflected from the original D is cut out in a prescribed width along a direction where the mirror 18a is extended, namely a main scanning direction and reflected towards the mirror 18b, but the catoptric light reflected from the original D is successively taken out in units of a width cut out from the mirror 18a with respect to a direction orthogonal to the direction where the mirror 18a is extended, namely a sub-scanning direction. According to this, all the image information of the original D is guided into the photoelectric conversion device 14. Incidentally, an electric signal outputted from the photoelectric conversion device 14 is an analogue signal and is converted into a digital signal by a non-illustrated A/D converter and temporarily stored as an image signal in a non-illustrated image memory.

Thus, the image of the original D placed on the original table 15 is converted into a digital image signal of, for example, 8 bits exhibiting light and shade of an image in a non-illustrated image processing section for every one line along the first direction where the mirror 18a is extended by the photoelectric conversion device 14.

The printer section 20 has the optical beam apparatus 21 as an exposure apparatus as explained later by referring to FIG. 2 and FIG. 3 and an image forming section 22 of an electrophotographic mode capable of forming an image on recording paper P as a medium on which an image is formed.

Figure 3:
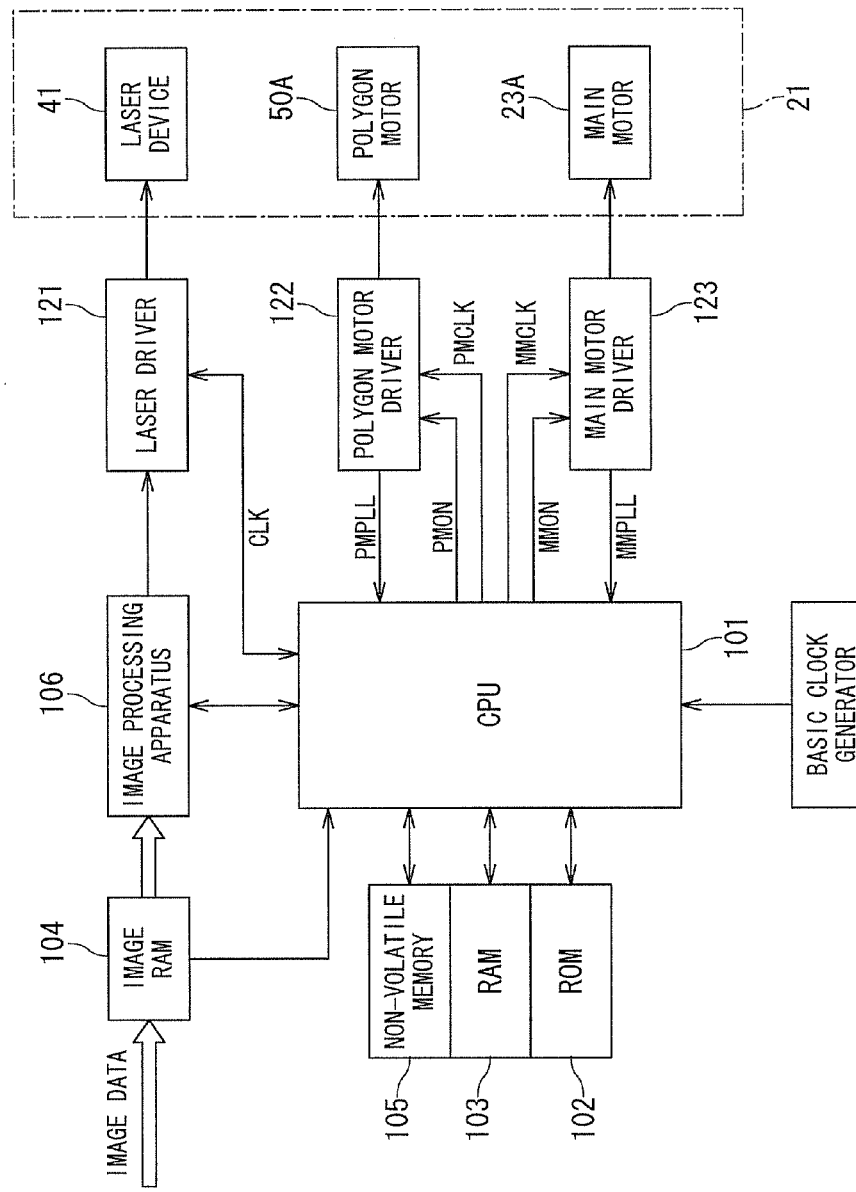
FIG. 3 is a view to show an outline configuration of the inside of a control system of an image forming apparatus provided with the optical beam scanning apparatus of FIG. 2.

The image forming section 22 is rotated by a main motor 23A such that an outer peripheral surface is moved at a prescribed rate as explained by referring to FIG. 3. The image forming section 22 has a drum-like photoconductor (hereinafter referred to as "photoconductive drum") 23 on which an electrostatic latent image is formed corresponding to an image data, namely the image of the original D upon irradiation with a laser beam (laser light) L from the optical beam scanning apparatus 21; a charging apparatus 24 forgiving a surface potential of a prescribed polarity to a surface of the photoconductive drum 23; a development apparatus for selectively feeding a toner as a visualizing material to the electrostatic latent image on the photoconductive drum 23 formed by the optical beam scanning apparatus and developing it; a transfer apparatus 26 for giving a prescribed electric field to a toner image formed on the outer periphery of the photoconductive drum 23 by the development apparatus 25 and transferring it onto the recording paper P; a separation apparatus 27 for releasing the recording paper P onto which the toner image has been transferred by the transfer apparatus 26 and the toner between the recording paper P and the photoconductive drum 23 from electrostatic adsorption with the photoconductive drum 23 and separating them from the photoconductive drum 23; and a cleaning apparatus 28 for removing the transfer residual toner remaining on the outer peripheral surface of the photoconductive drum 23 and returning the potential distribution of the photoconductive drum 23 to a state before the surface potential is fed by the charging apparatus 24; and the like.

Incidentally, the charging apparatus 24, the development apparatus 25, the transfer apparatus 26, the separation apparatus 27 and the cleaning apparatus 28 are disposed in this order along an arrow direction in which the photoconductor drum 23 is rotated. Also, the laser beam L from the optical beam scanning apparatus is irradiated in a prescribed position X on the photoconductive drum 23 between the charging apparatus 24 and the development apparatus 25.

In a non-illustrated image processing section, an image signal read from the original D in the scanner section 10 is not only converted into a printing signal by processing, for example, contour correction or gradation processing for half tone display but converted into a laser modulation signal for changing a light intensity of the laser beam L emitted from a semiconductor laser device (semiconductor laser device 41 of FIG. 2) of the optical beam scanning apparatus 21 as described later to any one of an intensity at which an electrostatic latent image can be recorded on the outer periphery of the photoconductive drum 23 to which a prescribed surface potential is given by the charging apparatus 24 or an intensity at which the latent image is not recorded.

Each semiconductor laser device (semiconductor laser device 41 of FIG. 2) provided in the optical beam scanning apparatus 21 is subjected to intensity modulation based on the foregoing laser modulation signal and emits light so as to record an electrostatic latent image in a prescribed position of the photoconductive drum 23 corresponding to a prescribed image data. This laser light from the semiconductor laser device is deflected in a first direction which is the same direction as a reading line of the scanner section 10 by a deflector (polygon mirror 50 as a deflector of FIG. 2) within the optical beam scanning apparatus 21 and irradiated in the prescribed position X on the outer periphery of the photoconductive drum 23.

Then, when the photoconductive drum 23 is rotated in the arrow direction at a prescribed rate, similar to the movement of the first carriage 11 and the second carriage 12 of the scanner section 10 along the original table 7, a laser beam from the semiconductor laser device which is successively deflected by the deflector (polygon mirror 50 as a deflector of FIG. 2) within the optical beam scanning apparatus 21 is exposed at prescribed intervals on the outer periphery of the photoconductive drum 23 for every one line.

An electrostatic latent image corresponding to the image signal is thus formed on the outer periphery of the photoconductive drum 23.

The electrostatic latent image formed on the outer periphery of the photoconductive drum 23 is developed with a toner from the development apparatus 25. A toner image developed with the toner is not only conveyed to a position opposing to the transfer apparatus 26 due to the rotation of the photoconductive drum 23 but transferred onto the recording paper P which is fed by taking out a single sheet thereof from a paper cassette 29 by a paper feed roller 30 and a separation roller 31 and then adjusting the timing by aligning rollers 32, due to an electric field from the transfer apparatus 26.

The recording paper P onto which the toner image has been transferred is separated together with the toner by the separation apparatus 27 and guided into a fixation apparatus 34 by a conveyance apparatus 33.

The recording paper P guided into the fixation apparatus 34 is subjected to fixation of the toner (toner image) due to a heat and a pressure from the fixation apparatus 34 and then discharged into a tray 36 by paper discharge rollers 35.

On the other hand, the photoconductive drum 23 in which the toner image (toner) has been transferred onto the recording paper P by the transfer apparatus 26 is made opposed to the cleaning apparatus 28 due to the subsequent continuous rotation. Then, the transfer residual toner (residual toner) remaining on the outer peripheral surface of the photoconductive drum 23 is removed by the cleaning apparatus 28. Furthermore, the photoconductive drum 23 is returned to an initial state which is a state before feeding a surface potential by the charging apparatus 24. According to this, next image formation becomes possible.

By repeating the foregoing process, a continuous image forming action becomes possible.

Thus, when the image information is read in the scanner section 10 and the read image information is converted into a toner image in the printer section 20 and outputted onto the recording paper P, the original D set on the original table 15 is copied.

Incidentally, while the foregoing image forming apparatus 1 has been applied to a digital copier or the like, it is not limited to such case. For example, it may be applied to a printer apparatus in which an image reading section is not present or the like.

Figure 2:
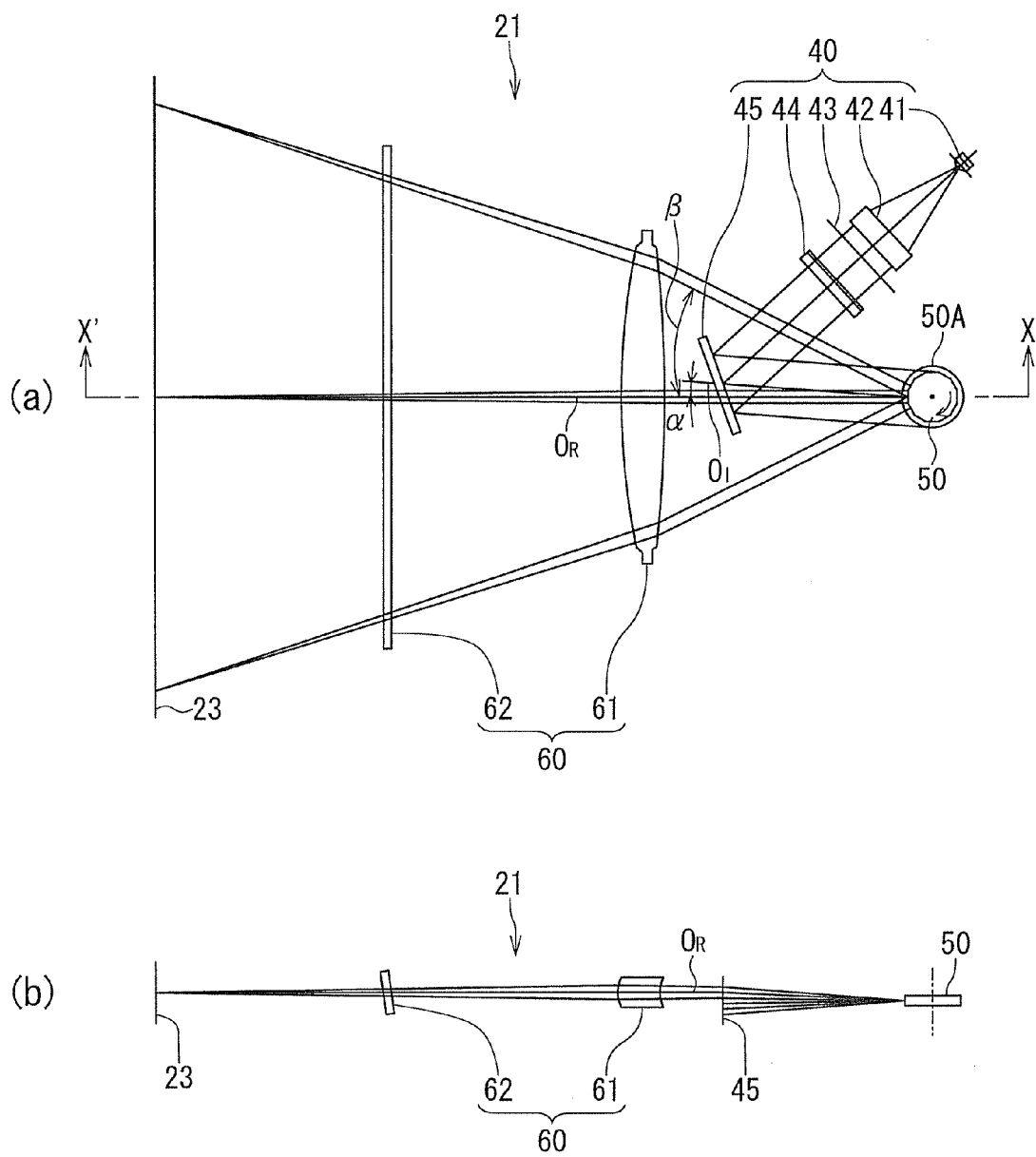
FIG. 2 is a view to show a detailed configuration of the optical beam scanning apparatus of FIG. 1.

FIG. 2(*a*) and FIG. 2(*b*) each shows a detailed configuration of the optical beam scanning apparatus 21 of FIG. 1. Incidentally, FIG. 2(*a*) is an outline plan view in the case where plural optical elements disposed between a light source (semiconductor laser device 41) included in the optical beam scanning apparatus 21 and the photoconductive drum 23 (defined as "scanning subject") are viewed from an orthogonal direction (sub-scanning direction) to a main scanning direction which is a parallel direction to a direction in which laser light going from the polygon mirror 50 as a deflector towards the photoconductive drum 23 is scanned by the polygon mirror 50. FIG. 2(*b*) is an outline cross-sectional view of the optical beam scanning apparatus 21 on an X-X' line of FIG. 2(*a*).

As illustrated in FIG. 2(*a*) and FIG. 2(*b*), the optical beam scanning apparatus 21 has a pre-deflection optical system 40 having the semiconductor laser device 41 for emitting the laser beam (laser light) L of, for example, 658 nm; a collimation lens 42 for converting a cross-sectional beam shape of the laser beam L emitted from the semiconductor laser device 41 into convergent light or parallel light or divergent light; an aperture 43 for controlling the quantity of light (luminous flux width) of the laser beam L which has passed through the collimation lens 42 to a prescribed size; a cylindrical lens 44 which is given a positive power only in the sub-scanning direction for the purpose of arranging the cross-sectional shape of the laser beam L, the quantity of light of which has been controlled by the aperture 43, into a prescribed cross-sectional beam shape; a mirror 45 for bending the laser beam L from the semiconductor laser device 41, which has been arranged into a prescribed cross-sectional beam shape by a finite focal lens or the collimation lens 42, the aperture 43 and the cylindrical lens 44, in a prescribed direction; and the like.

The polygon mirror 50 integrally formed with a polygon mirror motor 50A rotating at a prescribed rate is provided in a direction where the laser beam L to which a prescribed cross-sectional beam shape has been given by the pre-deflection optical system 40 advances. The polygon mirror 50 scans the laser beam L, the cross-sectional beam shape of which has been arranged into, a prescribed shape by the cylindrical lens 44, towards the photoconductive drum 23 positioned at a later stage.

A post-deflection optical system 60 for imaging the laser beam L which is continuously reflected on each of reflecting surfaces of the polygon mirror 50 in a generally straight line along an axis direction of the photoconductive drum 23 is provided between the polygon mirror 50 and the photoconductive drum 23.

The post-deflection optical system 60 is composed of an imaging lens (generally called as "fθ lens") 61; a dustproof glass 62 for preventing turnaround of the toner, dusts or paper powder or the like floating within the image forming section 22 into a non-illustrated housing of the optical beam scanning apparatus 21; and the like. The imaging lens 61 is able to irradiate the laser beam L continuously reflected on the individual reflecting surfaces of the polygon mirror 50 from one end to the other end of the longitudinal (axis) direction of the photoconductive drum 23 in the exposing position X as illustrated in FIG. 1 while making the position on the photoconductive drum 23 proportional to a rotation angle of each of the reflecting surfaces of the polygon mirror 50 upon irradiation on the photoconductive drum 23 and also to provide convergence properties to which a prescribed relation based on an angle at which the polygon mirror 50 is rotated so as to have a prescribed cross-sectional beam diameter in any position of the longitudinal direction on the photoconductive drum 23.

Incidentally, an optical path of the laser beam L from the semiconductor laser device 41 within the optical beam scanning apparatus 21 to the photoconductive drum is bent within a non-illustrated housing of the optical beam scanning apparatus 21 by non-illustrated plural mirrors or the like. Also, the imaging lens 61 and at least one non-illustrated mirror may be integrally formed in advance by optimizing curvatures of the imaging lens 61 in the main scanning direction and the sub-scanning direction and an optical path between the polygon mirror 50 and the photoconductive drum 23.

Also, in the optical beam scanning apparatus 21 as illustrated in FIG. 2(*a*) and FIG. 2(*b*), when an axis $O_I$ along a principal ray of the laser beam L made incident on each of the reflecting surfaces of the polygon mirror 50 and an optical axis $O_R$ of the post-deflection optical system 60 are each projected on a main scanning plane on the photoconductive drum 23, an angle α formed by the both is 5°, whereas a scanning angle β of a half-image region is 26°. Also, in the optical beam scanning apparatus 21 as illustrated in FIG. 2(*a*) and FIG. 2(*b*), an angle formed by the laser beam L made incident and the optical axis $O_R$ of the post-deflection optical system 60 is 2°.

Next, FIG. 3 shows an outline configuration of the inside of a control system of the image forming apparatus 1 including the optical beam scanning apparatus 21 as illustrated in FIG. 2(*a*) and FIG. 2(*b*).

A CPU (central processing unit) 101 as a main control apparatus is connected with a ROM (read only memory) 102 storing a prescribed operation rule or initial data; a RAM (random access memory) 103 for temporarily storing an inputted control data, a result of arithmetic processing by the CPU 101, or the like; an image RAM 104 for not only holding an image data from the photoelectric conversion device 14 or an image data fed from an external apparatus but outputting an image data to an image processing circuit 106; an NVM (non-volatile memory) 105 for holding a data which has been stored so far even in the case where electricity to the image forming apparatus 1 is blocked due to battery backup; the image processing circuit 106 for subjecting the image data stored in the image RAM 104 to prescribed image processing, thereby outputting a laser driver 121; and the like.

Also, the CPU 101 is connected with the laser driver 121 for making the semiconductor laser device 41 of the optical beam scanning apparatus 21 emit light; a polygon motor driver 122 for driving the polygon motor 50A for rotating the polygon mirror 50; a main motor driver 123 for driving the main motor 23A for driving the photoconductive drum 23, a conveyance mechanism of the recording paper P or the like; and the like.

In the optical beam scanning apparatus 21, the divergent laser beam L emitted from the semiconductor laser device 41 is converted into convergent light, parallel light or divergent light with respect to the cross-sectional beam shape by the lens 42.

The laser beam L, the cross-sectional beam shape of which has been converted into a prescribed shape, passes through the aperture 43, whereby not only the luminous flux width and the quantity of light are optimally set up, but prescribed convergence properties are given only in the sub-scanning direction by the cylindrical lens 44. According to this, the laser beam L becomes linear (line image) extending in the main scanning direction on each of the reflecting surfaces of the polygon mirror 50.

The polygon mirror 50 is, for example, a regular dodecahedron and is formed so as to have an inscribed circle diameter Dp of about 25 mm. When the number of reflecting surfaces of the polygon mirror 50 is defined as N, a width Wp of the main scanning direction of each of the reflecting surfaces (12 surfaces) of the polygon mirror 50 can be determined as expressed by [Expression 2].

$$Wp = \tan(\pi/N) \times Dp \quad \text{[Expression 2]}$$

In the case of the embodiment of the invention, the width Wp of the main scanning direction of each of the reflecting surfaces (12 surfaces) of the polygon mirror 50 is Wp=tan(π/12)×25=6.70 mm.

On the other hand, a beam width $D_L$ of the main scanning direction of the laser beam L irradiated on each of the reflecting surfaces of the polygon mirror 50 is generally 32 mm and is set up widely as compared with the width Wp=6.70 mm of the main scanning direction of the individual reflecting surfaces of the polygon mirror 50. By setting up the beam width $D_L$ of the main scanning direction of the laser beam L widely in the main scanning direction, it is possible to reduce scattering in the quantity of light between the scanning end and the scanning center on the image surface (photoconductive drum 23).

The laser beam L which has been scanned (deflected) in a straight line upon being guided onto each of the reflecting surfaces of the polygon mirror 50 and then continuously reflected due to the rotation of the polygon mirror 50 is imparted a prescribed imaging characteristic by the imaging lens 61 of the post-deflection optical system 60 such that the cross-sectional beam diameter is generally uniform in at least the main scanning direction on the photoconductive drum 23 (image surface) and imaged in a generally straight line on the surface of the photoconductive drum 23.

Also, the rotation angle of the individual reflecting surfaces of the polygon mirror 50 and the scanning position (imaging position) of the light beam imaged on the photoconductive drum 23 are corrected by the imaging lens 61 so as to have a proportional relation with each other. Accordingly, the speed of the light beam which is scanned in a straight line on the photoconductive drum 23 becomes constant over the entire scanning region by the imaging lens 61. Incidentally, in the imaging lens 61, the respective reflecting surfaces of the polygon mirror 50 are individually non-parallel to the sub-scanning direction, namely a curvature (curvature of the sub-scanning direction) capable of correcting a deviation of the scanning position in the sub-scanning direction due to an influence caused by the generation of inclination on each of the reflecting surfaces is imparted. Furthermore, an image surface curve of the sub-scanning direction is corrected, too. In order to correct these optical characteristics, the curvature of the sub-scanning direction is changed by the scanning position.

The shape of the lens surface of the imaging lens 61 has numerical values as shown in, for example, FIG. 4 and is defined according to [Expression 3].

$$X = \frac{CUY*y^2 + CUZ*z^2}{1 + \sqrt{\begin{array}{c}1 - AY*CUY^2 * \\ y^2 - AZ*CUZ^2 * z^2\end{array}}} + \sum_{n=0}\sum_{m=0} A_{mn} y^m z^{2n} \quad \text{[Expression 3]}$$

By using such imaging lens 61, the rotation angle θ of the individual reflecting surfaces of the polygon mirror 50 and the position of the laser beam L to be imaged on the photoconductive drum 23 are made generally proportional to each other, it is possible to correct the position when the laser beam L is imaged on the photoconductive drum 23.

Also, the imaging lens 61 is able to correct a deviation of the inclination of the sub-scanning direction of the mutual respective reflecting surfaces of the polygon mirror 50, namely a deviation of the position of the sub-scanning direction caused due to scattering in the amount of surface inclination.

Concretely, by making the laser beam incident surface (the side of the polygon mirror 50) and the emitting surface (the side of the photoconductive drum 23) of the imaging lens 61 have a generally optical conjugated relation, even in the case where an inclination defined between an arbitrary reflecting surface of the polygon mirror 50 and the rotation axis of the polygon mirror 50 defers in every reflecting surface, it is possible to correct a deviation of the scanning position of the sub-scanning direction of the laser beam L guided onto the photoconductive drum 23.

Incidentally, since the cross-sectional beam diameter of the laser beam L replies upon a wavelength of the light beam L emitted from the semiconductor laser device 41, when the wavelength of the laser beam L is set up at 785 nm, it is possible to make the cross-sectional beam diameter of the laser beam L large. Also, by setting up the wavelength at 630 nm or shorter, it is possible to make the cross-sectional beam diameter of the laser beam L smaller.

The reflection mirror after the deflection is configured of a plane surface, and correction of the surface inclination is performed only by the imaging lens 61.

As a matter of course, the surface shape of the imaging lens 61 may be, for example, a toric lens having a rotation symmetrical axis to the main scanning axis and having a varied curvature of the sub-scanning direction depending upon the scanning position. According to this, a refractive power of the sub-scanning direction varies depending upon the scanning position, and a scanning line curvature can be corrected. Furthermore, in the case where the curved surface of the sub-scanning direction has a rotation symmetrical axis, a degree of freedom of the curvature of the sub-scanning direction is widened, and it is possible to achieve the correction more precisely.

Figure 5:
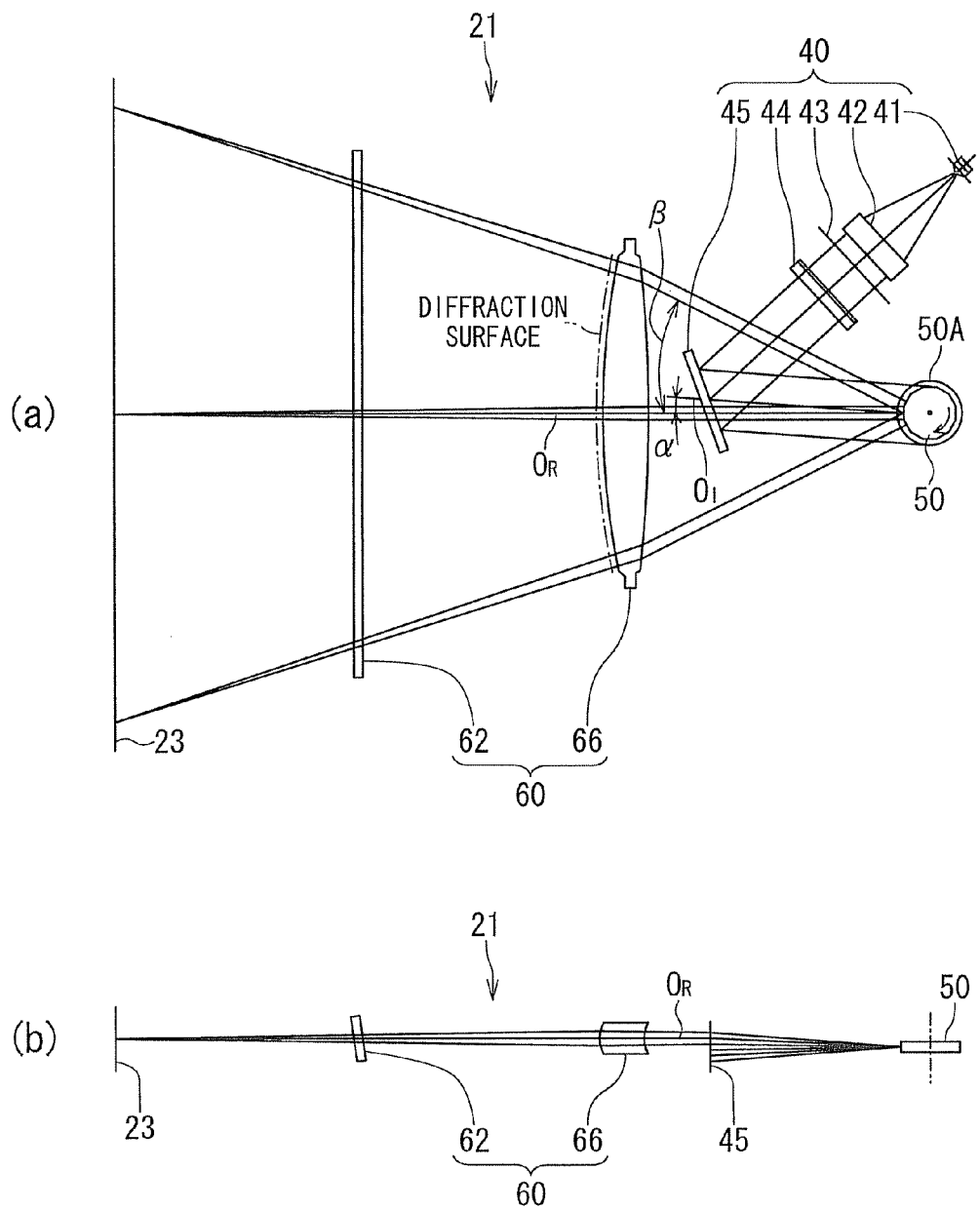
FIG. 5 is an explanatory view to explain an imaging lens including a surface having a diffraction surface.

Here, for example, as in an imaging lens 66 as illustrated in FIGS. 5(*a*) and 5(*b*), the imaging lens 61 which is included in the post-deflection optical system 60 may include a surface having a diffraction surface (diffraction optical device). According to this, the influence due to an environmental fluctuation can be reduced. Incidentally, in the case of the imaging lens 66 as illustrated in FIGS. 5(*a*) and 5(*b*), the diffraction surface is provided only in a side of the emitting surface, but the diffraction surface may be provided in a side of the incident surface or on the both surfaces. As a matter of course, the same is also applicable in the case where plural imaging lenses are configured. Also, not only the imaging lens but other optical device may be provided.

Figure 6:
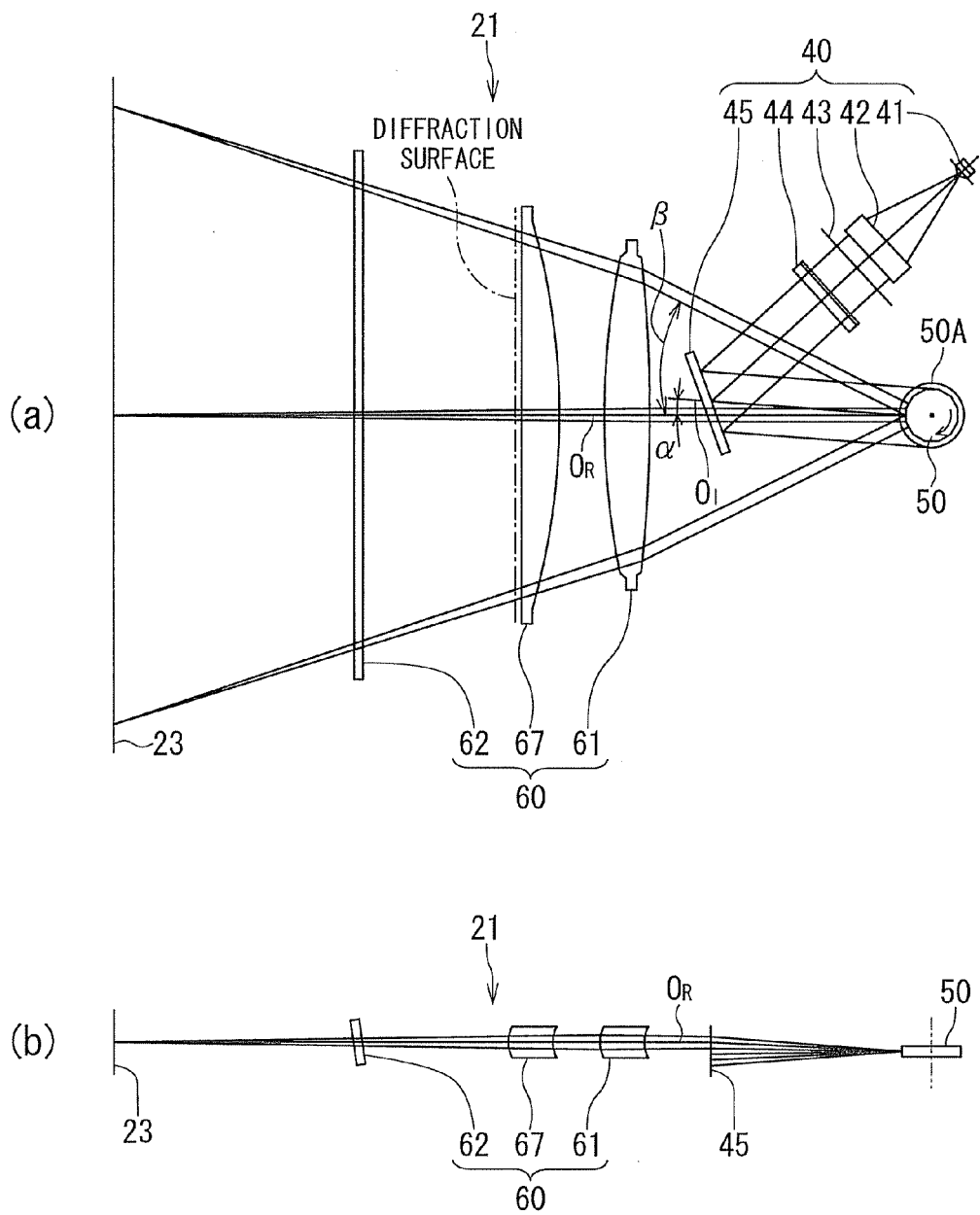
FIG. 6 is an explanatory view to explain other imaging lens including a surface having a diffraction surface.

Also, in general, for example, as in an imaging lens 67 as illustrated in FIGS. 6(*a*) and 6(*b*), the diffraction surface is provided on a plane surface. But, for example, as in the imaging lens 66 as illustrated in FIGS. 5(*a*) and 5(*b*), by imparting it to a surface with a power, it is possible to reduce the number of lenses. Furthermore, by bringing a power by a diffraction optical device, it is possible to reduce a fluctuation in the wall thickness or to make the wall thickness thin; and it is possible to improve the productivity and the precision and to reduce the cost due to shortening of a molding time.

Figure 7:
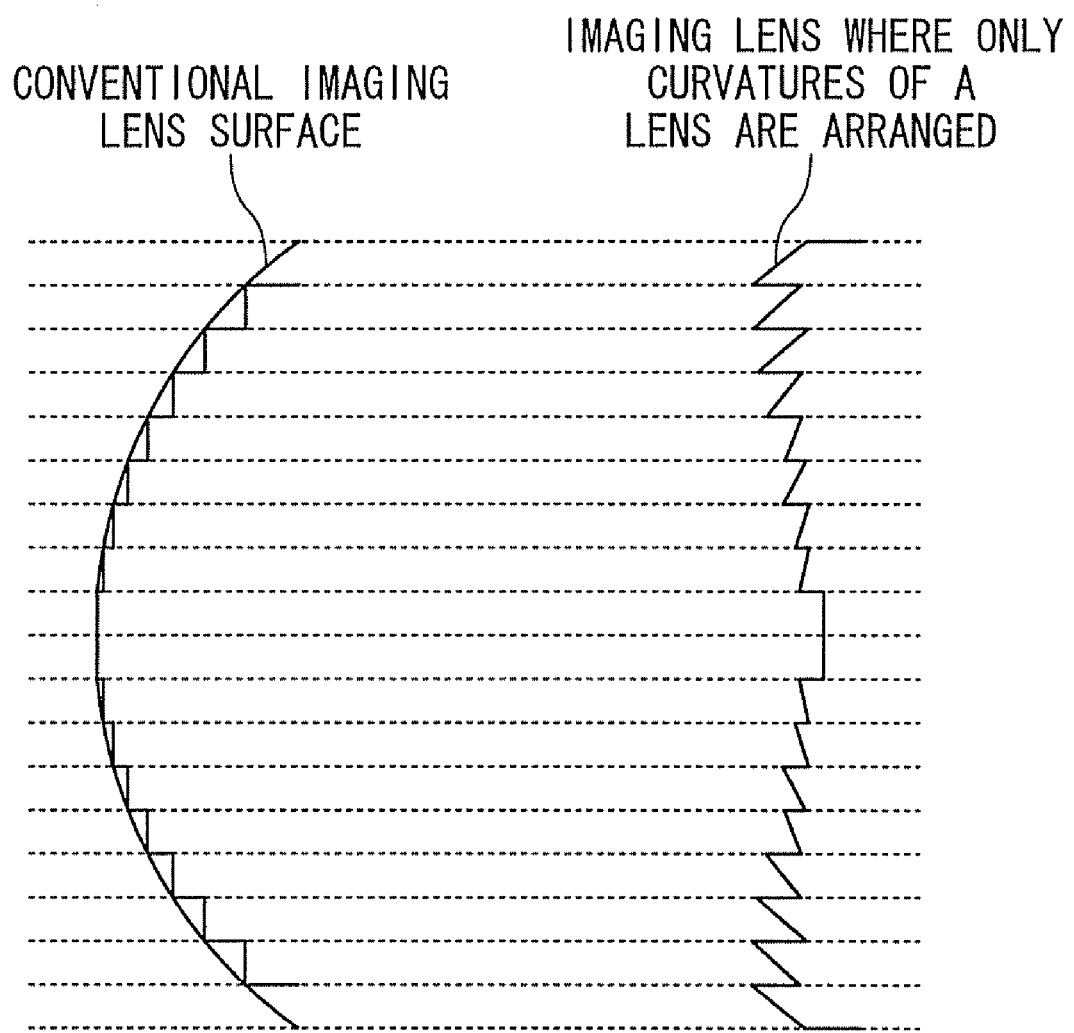
FIG. 7 is an explanatory view to explain an imaging lens where only curvatures of a lens are arranged.
Figure 8:
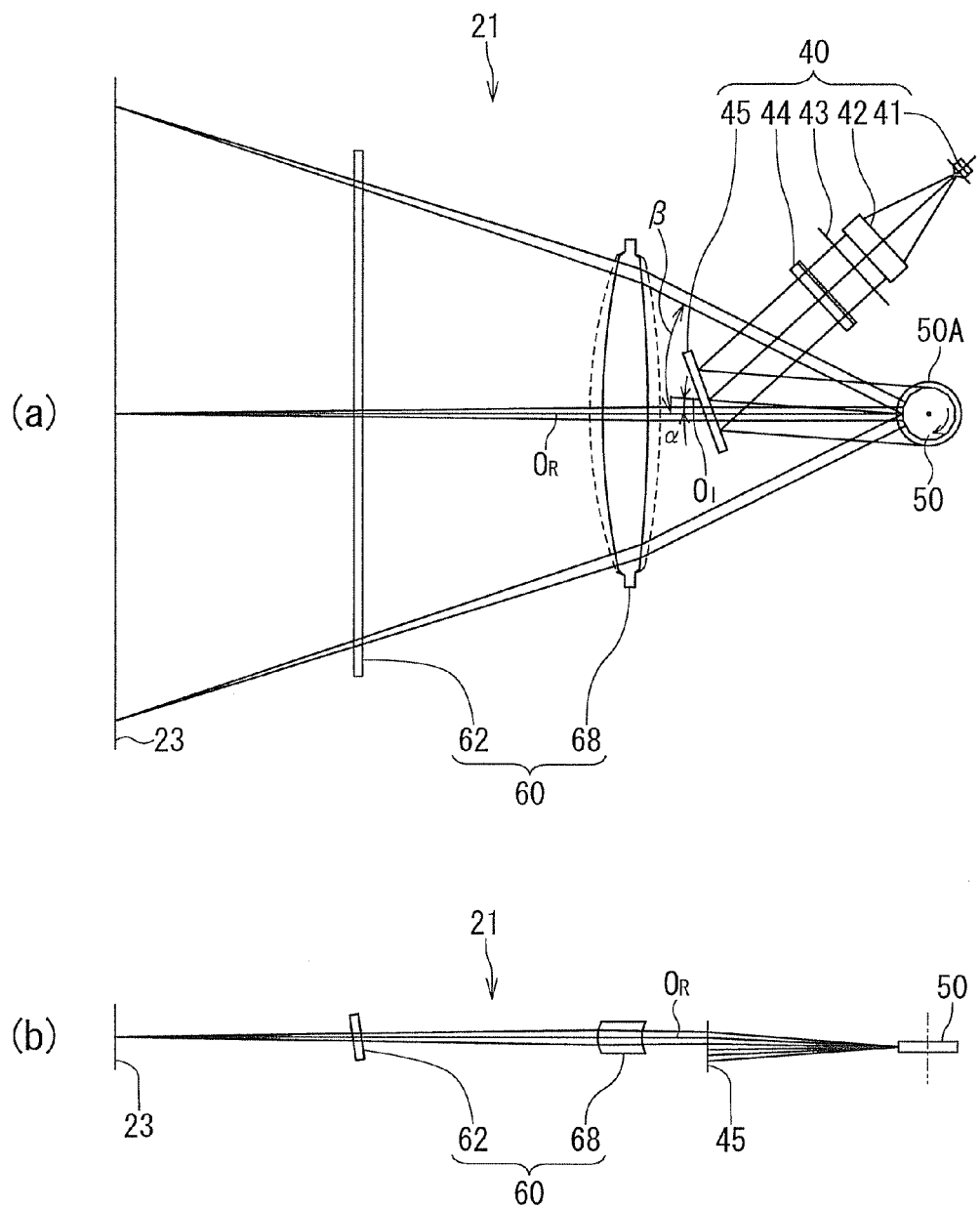
FIG. 8 is an explanatory view to explain other imaging lens including a surface having a diffraction surface.

That is, for example, as illustrated in FIG. 7, by arranging only curvatures of lens having a power of the conventional imaging lens 61, it is possible to reduce a fluctuation in the wall thickness and to make the wall thickness thin while having a lens action. According to this, as in an imaging lens 68 as illustrated in FIG. 8, the fluctuation in the wall thickness of lens can be reduced. Also, in the case where plural optical devices after the deflection are configured, the number of optical devices can be reduced.

Incidentally, a non-illustrated horizontal synchronous sensor is provided in an opposite side to the polygon mirror 50.

Now, in the case of manufacturing the imaging lens 61 by using a resin as a material of the imaging lens 61, making the resin flow in from a gate opening provided in advance in a molding die and then molding the resin into a prescribed shape, it is necessary to perform gate cutting in the gate opening side of the imaging lens 61 after molding the resin. But, a residual strain or deformation is generated in a side corresponding to the gate opening side of the manufactured imaging lens 61, namely in the vicinity of the gate cut part due to a heat at the time of gate cutting.

Then, first of all, the residual strain or deformation generated in the vicinity of the gate cut part of the imaging lens 61 of a central gate in the case where the gate cut position for performing gate cutting is arranged in a central part of the bottom of the imaging lens 61 is described.

Figure 9:
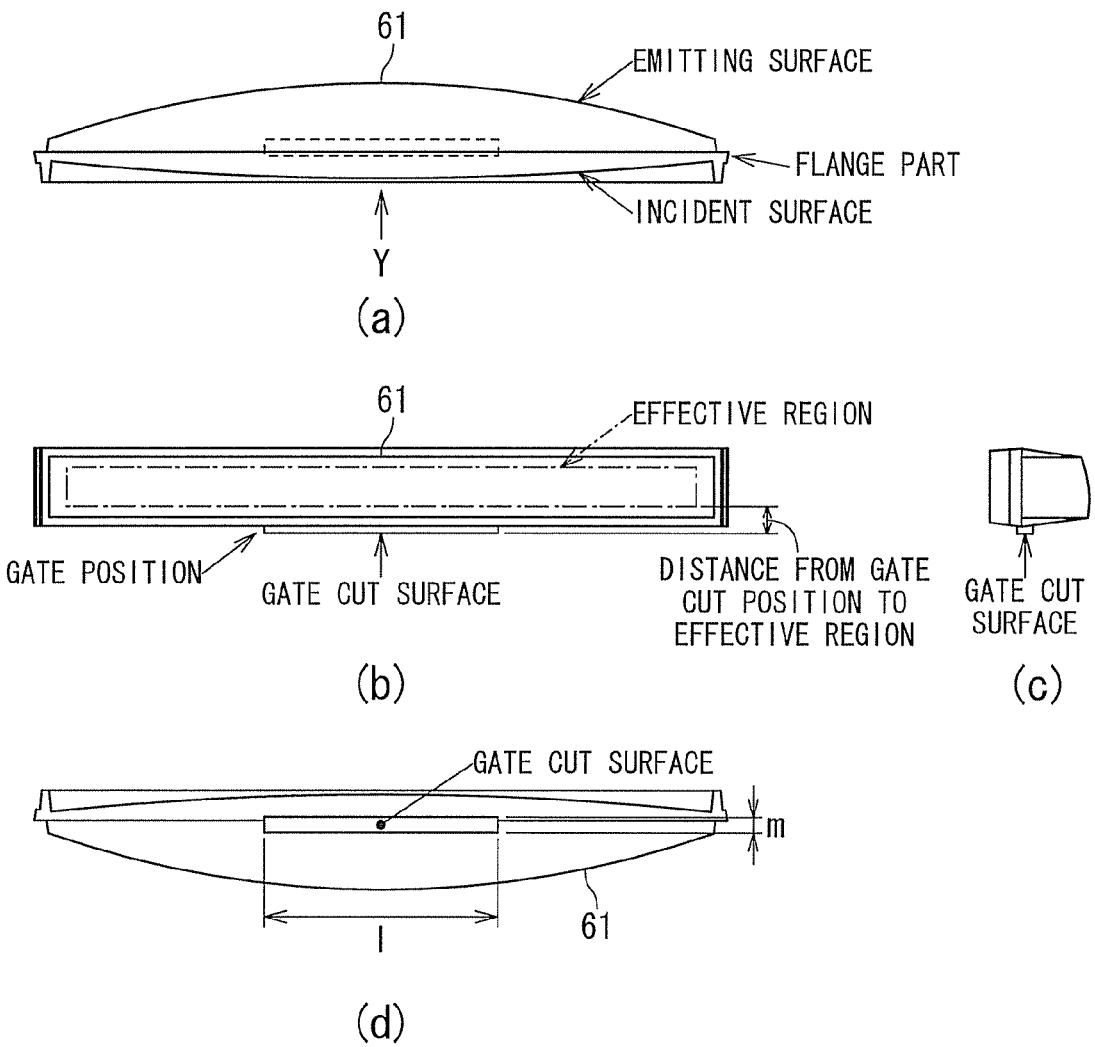
FIG. 9 is an explanatory view to explain an imaging lens of a central gate where a gate cut position is arranged in a central part on a bottom surface of an imaging lens.

FIGS. 9(*a*) to 9(*d*) each shows the imaging lens 61 of a central gate where the gate cut position is arranged in the central part of the bottom of the imaging lens 61. Incidentally, FIG. 9(*a*) is a plan view of the imaging lens 61; and FIG. 9(*b*) is a view seen from a Y direction of FIG. 9(*a*). FIG. 9(*c*) is a side view of FIG. 9(*b*); and FIG. 9(*d*) is a plan view in the case where the imaging lens 61 of FIG. 9(*a*) is seen from a direction of the bottom.

Here, when a length in the longitudinal direction and a length in the ray advancing direction (optical axis direction) of the gate opening are defined as "l" and "m", respectively, for example, l=60 mm and m=4 mm.

The shape of the lens surface of the imaging lens 61 as illustrated in FIGS. 9(*a*) to 9(*d*) has numerical values as shown in, for example, FIG. 10 and is defined according to [Expression 3]. A material of this imaging lens 61 is a methyl methacrylate resin (PMMA: polymethyl methacrylate). The "effective region" as referred to herein is defined as a region where the laser beam L as catoptric light reflected from the polygon mirror 50 effectively passes through the imaging lens 61 and forms an image on the photoconductive drum 23.

Figure 11:
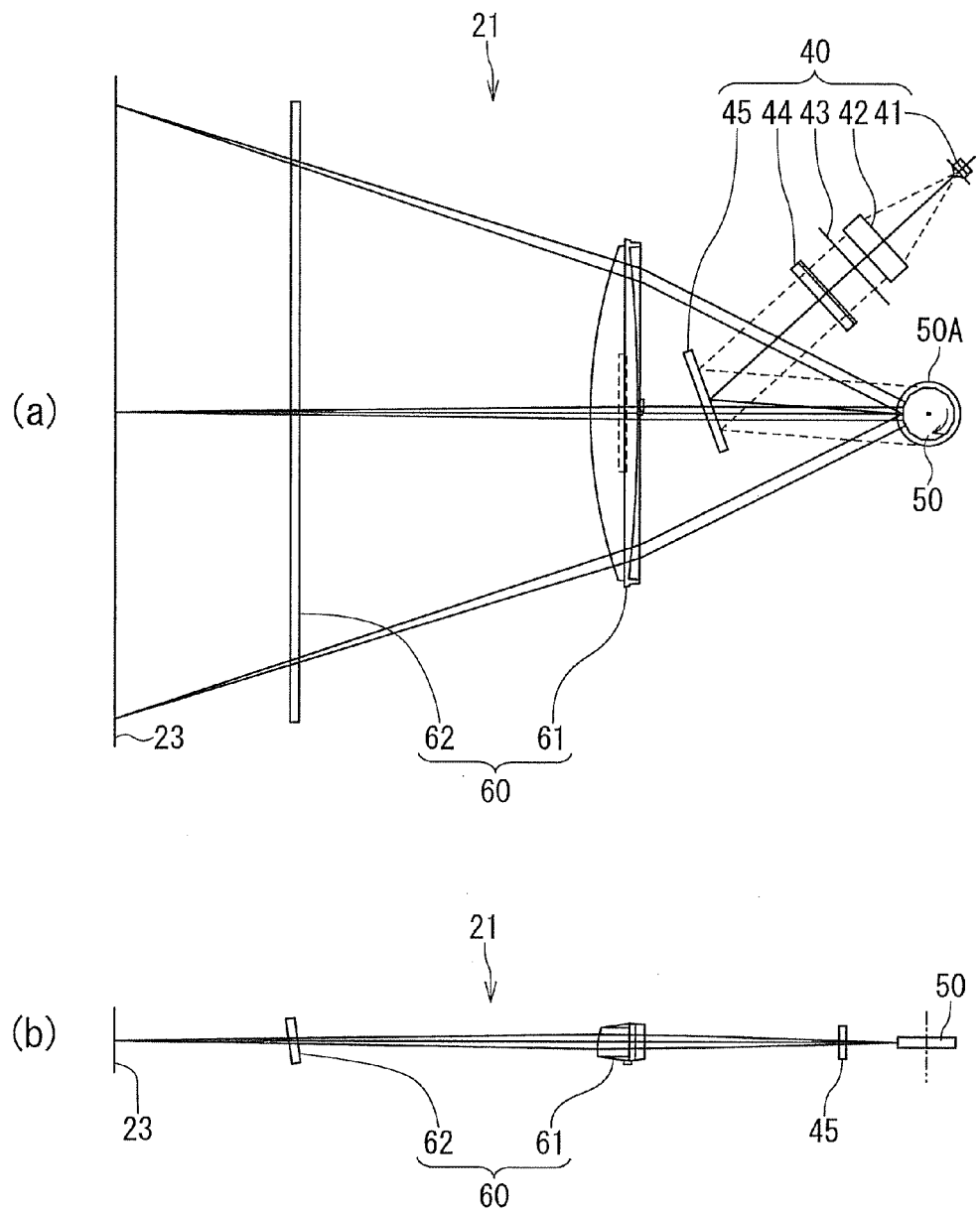
FIG. 11 is a view to show a detailed configuration of an optical beam scanning apparatus in the case of using the imaging lens of FIG. 9.

A configuration of the optical beam scanning apparatus 21 using this imaging lens 61 is illustrated in FIG. 11. At this time, an inscribed circle diameter Dp of the polygon mirror 50 is 29 mm.

Figures 12, 13:
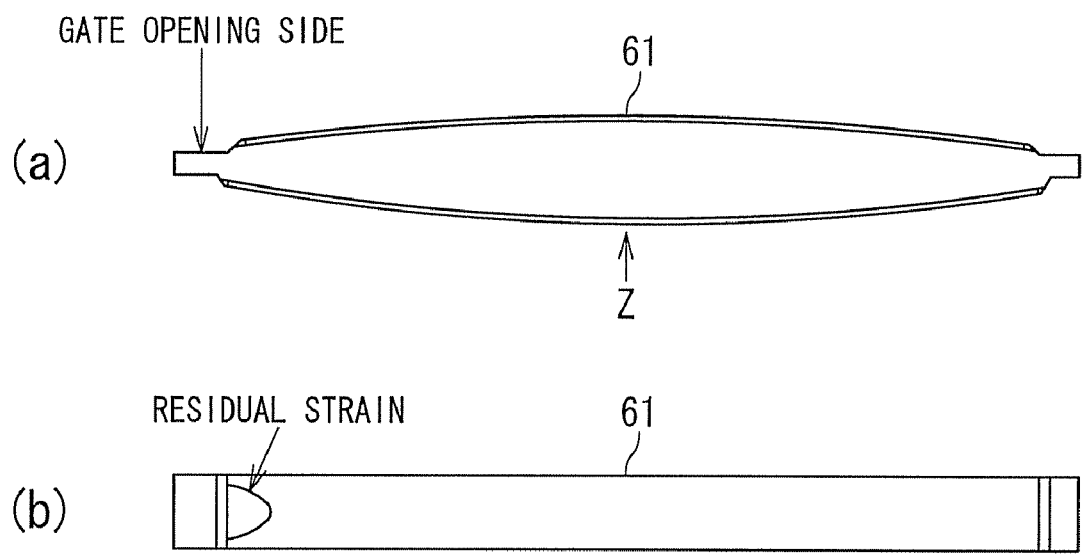
FIG. 12 is a diagram to show a relation between a distance from a gate cut position to an effective region and a beam diameter in the case of an imaging lens of a central gate.
FIG. 13 is an explanatory view to explain a residual strain or deformation or the like due to a heat at the time of gate cutting as generated in an imaging lens 61.

Next, FIG. 12 shows a relation between a distance from a gate cut position to an effective region and a beam diameter in the case of the imaging lens of 61 of a central gate.

As shown in FIG. 12, when the distance from the gate cut position to the effective region is short, the beam diameter becomes large with respect to the beam diameter of 60 μm as a designed value. This means that when the distance from the gate cut position to the effective region is short, the optical characteristics of the effective region are influenced. In particular, in the case of the imaging lens 61 of a central gate, the range on the effective region influenced by a heat at the time gate cutting becomes large, and of the effective region, a region influencing the optical characteristics becomes large.

Accordingly, in the case of manufacturing the imaging lens 61 by making a resin flow in from a gate opening provided in advance in a molding die and then molding the resin, it is desirable that the manufacture is carried out in aside gate rather than a central gate. Also, for the purpose of minimizing the influence against the optical characteristics of the effective region, when it is intended to make the distance from the gate cut position to the effective region long, it is necessary that a molding die in which the resin is made to flow is increased in size, leading to an increase of the molding die cost. Furthermore, a molding machine with a large clamping force becomes necessary. Thus, it is better that the distance between the gate cut position and the effective region is short.

Then, in the case of manufacturing the imaging lens 61 by making a resin flow in from a gate opening provided in advance in a molding die and then molding the resin, a side gate is used. But, even by using a side gate, a residual strain or deformation or the like is generated in an end of the imaging lens 61 in the side corresponding to the gate opening side in which the resin is made to flow or the like due to a heat at the time of gate cutting.

Concretely, in the case where the imaging lens 61 of the post-deflection optical system 60 is a molded lens manufactured by molding a resin which has been made to flow in from the side gate opening, for example, as illustrated in FIGS. 13(*a*) and 13(*b*), a residual strain or deformation or the like is still generated in a lens in a side corresponding to the gate opening side (in particular, an end of lens or the like) due to a heat at the time of gate cutting. Incidentally, FIG. 13(*b*) is a view seen from a Z direction of FIG. 13(*a*).

When a luminous flux (laser light) passes through the gate cut part of the imaging lens 61 in which such a residual strain or deformation or the like has been generated due to a heat at the time of gate cutting, the beam diameter on the image surface becomes larger than the usual.

In particular, in the case where the imaging lens 61 of the post-deflection optical system 60 is configured of a single lens, since the imaging lens 61 is required to have a larger power, it must be finished as a wall-thick lens. For that reason, the cross-sectional area of the imaging lens 61 (gate cut part of the imaging lens 61) which is molded in the vicinity of the side gate opening for making a resin flow in becomes large so that when it is intended to gate cut this portion, a residual strain or deformation is still more likely generated in the imaging lens 61 due to a heat at the time of gate cutting. As a result, when a luminous flux (laser light) passes through the gate cut part of the imaging lens 61, the beam diameter on the image surface still more becomes large as compared with the usual.

Here, in the overillumination scanning optical system, a width of the laser beam L corresponding to the main scanning direction varies depending upon the scanning position (angle).

Figure 14:
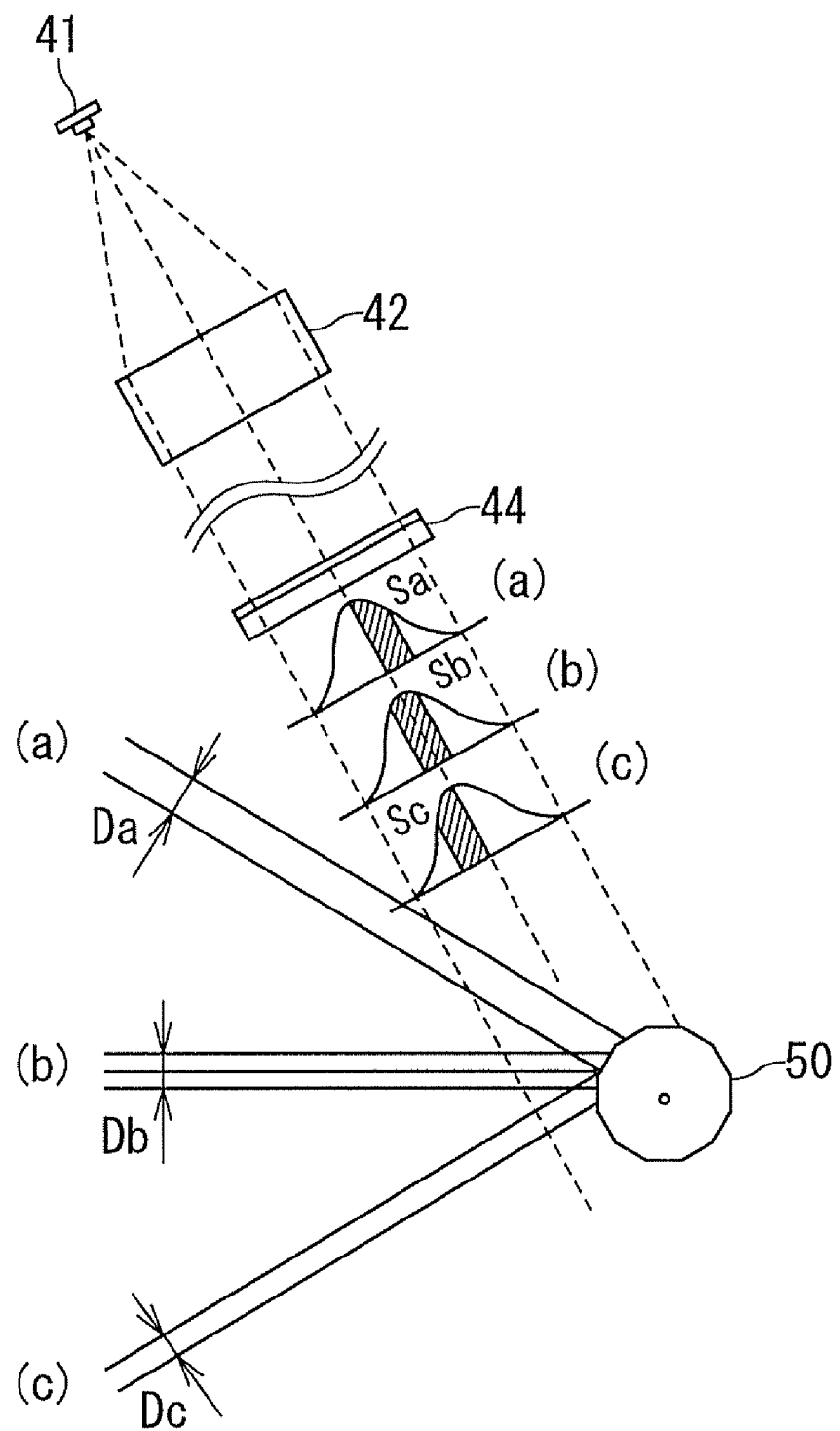
FIG. 14 is a view to show a relation between a scanning angle of a polygon mirror and a reflecting beam diameter.

Concretely, for example, as illustrated in FIG. 14, in the case where the optical axis of the laser beam L made incident on the polygon mirror 50 and the optical axis of the post-deflection optical system form an angle, a width of the luminous flux corresponding to the main scanning direction varies by the scanning position (angle).

That is, a width in a light incidence side (a) when the laser beam L is made incident on the polygon mirror 50, a central position (b) of the scanning region of the photoconductive drum 23 and an opposite side (c) to the light incidence side (width of the laser beam L corresponding to the main scanning direction) is Da, Db and Dc, respectively, and these widths become small in the order of Da>Db>Dc. For that reason, the F number varies depending upon the scanning position (angle) and the beam diameter of the main scanning direction on the image surface is proportional to the F number; and when the laser beam L is made incident on the polygon mirror 50, as it goes from the light incidence side (a) to the opposite side (c) to the light incidence side, the beam diameter of the main scanning direction on the image surface becomes large, thereby generating scattering in beam diameter of the main scanning direction on the image surface (photoconductive drum 23). In other words, the beam diameter of the main scanning direction on the image surface (photoconductive drum 23) is bilaterally asymmetric against the optical axis of the optical system in the scanning region on the photoconductive drum 23; and when the laser beam L is made incident on the polygon mirror 50, as it goes from the light incidence side (a) to the opposite side (c) to the light incidence side, the optical characteristics on the image surface become worse.

For that reason, in the case of manufacturing the imaging lens 61 by making a resin flow in from the gate opening and then molding the resin, when a side gate is used, if the gate cut part of the imaging lens 61 is arranged in the opposite side to the light incidence side, in the opposite side to the light incidence side, in addition to the worseness of optical characteristics on the image surface (photoconductive drum 23), the beam diameter on the image surface (photoconductive drum 23) becomes very large due to influences of a residual strain or deformation generated at the time of gate cutting.

As a result, scattering in the beam diameter in the scanning region of the photoconductive drum 23 as an image surface becomes large.

Figure 15:
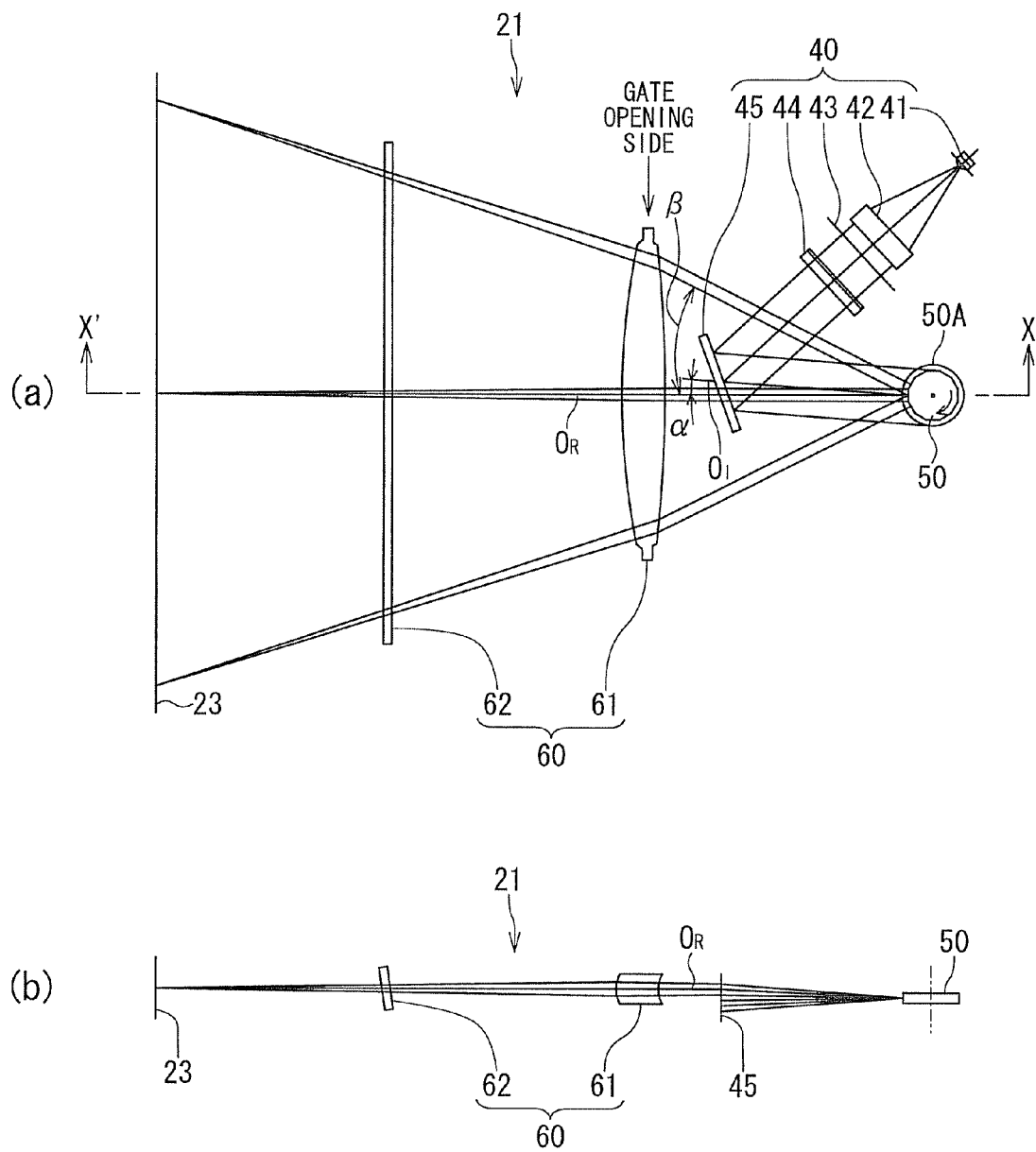
FIG. 15 is a view to show a detailed configuration of an optical beam scanning apparatus in the case a gate cut part of an imaging lens is arranged in a light incidence side.

Then, for example, as illustrated in FIG. 15, a gate cut part of the imaging lens 61 is arranged in the light incidence side (namely, a side corresponding to the gate opening side of the imaging lens 61). According to this, not only the matter that in the opposite side to the light incidence side, the beam diameter on the image surface (photoconductive drum 23) becomes very large due to the influences of a residual strain or deformation generated at the time of gate cutting in addition to the worseness of optical characteristics on the image surface can be prevented, but the scattering in the beam diameter in the scanning region on the photoconductive drum 23 can be reduced and made uniform.

Accordingly, even in the case where a residual strain or deformation is generated at the time of forming a lens, not only it is possible to reduce the scattering in the beam diameter in the scanning region, but it is possible to prevent the deterioration of image quality and to devise to realize high image quality. Also, it is possible to reduce the manufacturing cost of the image forming apparatus 1.

Incidentally, as a matter of course, the invention is also applicable to imaging lenses including a surface having a diffraction surface (diffraction optical device) (for example, imaging lens 66 to 68 explained with reference to FIGS. 5 to 8).

Furthermore, the number of a luminous flux from the light source may be one or plural.

What is claimed is:

1. An optical beam scanning apparatus comprising:
   a light source to emit one or plural luminous fluxes,
   a pre-deflection optical system to form a luminous flux emitted from the light source to image the luminous flux as a line image in a main scanning direction,
   a scanning unit configured to scan the imaged luminous flux by the pre-deflection optical system against a scanning subject, having at least one reflecting surface in which a width of the luminous flux made incident on the scanning unit from the pre-deflection optical system is wider than a width of the one reflecting surface forming the scanning unit, and
   a post-deflection optical system to image the luminous flux scanned by the scanning unit on the scanning subject, including at least one optical element configured by a resin flowed into a molding die, the resin having a prescribed shape, the at least one optical element having a side in which a residual strain is generated, the side being located to a light incidence side where the luminous flux enters into the scanning unit.

2. The optical beam scanning apparatus according to claim 1, wherein the optical element is a lens.

3. The optical beam scanning apparatus according to claim 1, wherein the optical element is configured of a single lens.

4. The optical beam scanning apparatus according to claim 1, wherein
   the post-deflection optical system includes plural optical elements configured by a resin flowed into a molding die, the resin having a prescribed shape; and
   in at least one optical element of the plural optical elements, a side in which the residual strain is generated is located to the light incidence side where the luminous flux enters into the scanning unit.

5. The optical beam scanning apparatus according to claim 4, wherein in all of the optical elements of the plural optical elements, a side in which the residual strain is generated is located in the light incidence side enters into the luminous flux made incident on the scanning unit.

6. The optical beam scanning apparatus according to claim 1, wherein in the optical element, a gate cut part of the optical element is included in a side in which the residual strain is generated.

7. The optical beam scanning apparatus according to claim 1, wherein at least one surface of the optical element included in the post-deflection optical system is configured of a diffraction optical device.

8. A method of manufacturing of an optical beam scanning apparatus comprising: a light source to emit one or plural luminous fluxes; a pre-deflection optical system to form a luminous flux emitted from the light source to image the luminous flux as a line image in a main scanning direction; a scanning unit configured to scan the imaged luminous flux by the pre-deflection optical system against a scanning subject, having at least one reflecting surface in which a width of the luminous flux made incident on the scanning unit from the pre-deflection optical system is wider than a width of the one reflecting surface forming the scanning unit; and a post-deflection optical system to image the luminous flux scanned by the scanning unit on the scanning subject, the method comprising:

allowing a resin to flow into a molding die having a prescribed shape;

molding the flown-in resin to manufacture at least one optical element included in the post-deflection optical system; and arranging the at least one optical element such that a side of the at least one optical element in which a residual strain is generated is located to a light incidence side where the luminous flux enters into the scanning unit.

9. An image forming apparatus provided with an optical beam scanning apparatus comprising:

a light source to emit one or plural luminous fluxes, a pre-deflection optical system to form a luminous flux emitted from the light source to image the luminous flux as a line image in a main scanning direction, a scanning unit configured to scan the imaged luminous flux by the pre-deflection optical system against a scanning subject, having at least one reflecting surface in which a width of the luminous flux made incident on the scanning unit from the pre-deflection optical system is wider than a width of the one reflecting surface forming the scanning unit, and a post-deflection optical system to image the luminous flux scanned by the scanning unit on the scanning subject, including at least one optical element configured by a resin flowed into a molding die, the resin having a prescribed shape, the at least one optical element having a side in which a residual strain is generated, the side being located to a light incidence side where the luminous flux enters into the scanning unit.

10. The image forming apparatus according to claim 9, wherein the optical element is a lens.

11. The image forming apparatus according to claim 9, wherein the optical element is configured of a single lens.

12. The image forming apparatus according to claim 9, wherein the post-deflection optical system includes plural optical elements configured by a resin flowed into a molding die, the resin having a prescribed shape; and in at least one optical element of the plural optical elements, a side in which the residual strain is generated is located in a light incidence side where the luminous flux enters into the scanning unit.

13. The image forming apparatus according to claim 12, wherein in all of the optical elements of the plural optical elements, a side in which the residual strain is generated is located in the light incidence side where the luminous flux enters into the scanning unit.

14. The image forming apparatus according to claim 9, wherein in the optical element, a gate cut part of the optical element is included in a side in which the residual strain is generated.

15. The image forming apparatus according to claim 9, wherein at least one surface of the optical element included in the post-deflection optical system is configured of a diffraction optical device.

16. A method of manufacturing of an image forming apparatus provided with an optical beam scanning apparatus comprising:

a light source to emit one or plural luminous fluxes;

a pre-deflection optical system to form a luminous flux emitted from the light source to image the luminous flux as a line image in a main scanning direction;

a scanning unit configured to scan the imaged luminous flux by the pre-deflection optical system against a scanning subject, having at least one reflecting surface in which a width of the luminous flux made incident on the scanning unit from the pre-deflection optical system is wider than a width of the one reflecting surface forming the scanning unit; and a post-deflection optical system to image the luminous flux scanned by the scanning unit on the scanning subject, the method comprising:

allowing a resin to flow into a molding die having a prescribed shape;

molding the flown-in resin is molded into a prescribed shape to manufacture at least one optical element included in the post-deflection optical system; and arranging the at least one optical element such that a side of the at least one optical element in which a residual strain is generated is located to a light incidence side where the luminous flux enters into the scanning unit.

* * * * *